United States Patent Office
3,299,085
Patented Jan. 17, 1967

3,299,085
CERTAIN BENZAZOLYL-SUBSTITUTED
IMIDAZOLIDINES
Werner Schäfer and Richard Wegler, Leverkusen, Ludwig Eue, Cologne-Stammheim, and Helmuth Hack, Opladen, Germany, assignors to Farbenfabriken Bayer Aktiengesellschaft, Leverkusen, Germany, a corporation of Germany
No Drawing. Filed Feb. 17, 1965, Ser. No. 433,515
Claims priority, application Germany, Feb. 21, 1964,
F 42,081
17 Claims. (Cl. 260—305)

The present invention concerns particular novel substituted imidazolidines which have selective herbicidal properties, as well as a process for their production.

It has already been disclosed that aromatic-substituted imidazolidines, such as the imidazolidine

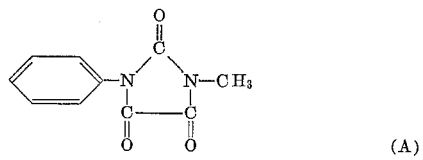

(A)

have a herbicidal activity (see U.S. Patent No. 2,895,817).

It is an object of the present invention to provide particular novel substituted imidazolidines having valuable properties.

It is another object of the present invention to provide particular novel substituted imidazolidines which possess selective herbicidal or phytocidal properties.

It is another object of the present invention to provide for the controlled destruction of post-emergence weeds.

It is another object of the present invention to provide a process for the production of particular novel substituted imidazolidines using oxalyl halides or oxalic acid esters and a corresponding benzthiazolyl- or benzoxazolylurea or thiourea.

It is a further object of the present invention to provide phytotoxic or herbicidal preparations comprising a carrier vehicle in admixture with a substituted imidazolidine of the instant type.

It is a still further object of the present invention to provide compositions, with carrier materials, containing the particular substituted imidazolidine compound of the instant type in sufficient quantity to destroy post-emergence weeds, selectively, where the same exist in the soil with valuable crops such as beets, oats, cotton, wheat, tomatoes, beans, etc., which are not also destroyed by such imidazolidines.

It is a still further object of the present invention to provide a method of combatting post-emergence weeds in the soil which includes applying to such emergence weeds a phytotoxic and/or a phytocidal or herbicidal amount of a particular imidazolidine of the instant type.

Other and further objects of the present invention will become apparent from a study of the within specification and accompanying examples.

It has been found in accordance with the present invention that the particular novel substituted imidazolidines of the formula

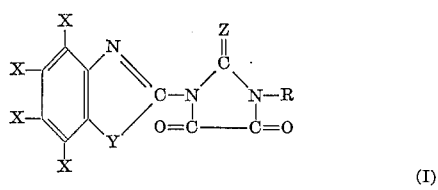

(I)

wherein Y and Z denote oxygen or sulphur, X denotes hydrogen, alkyl with 1 to 2 carbon atoms and/or halogen, and R denotes hydrogen or an aliphatic radical with 1 to 5 carbon atoms, optionally substituted by halogen, exhibit strong herbicidal, and in particular selective herbicidal, properties.

In addition, it has been found that substituted imidazolidines of Formula (I) are obtained when urea derivatives of the formula

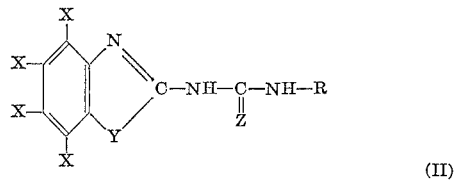

(II)

wherein X, Y, Z, and R have the above stated significance, are reacted with oxalyl chloride or another reactive derivative of oxalic acid.

It is surprising that the substituted imidazolidines (i.e. 1,2,4,5- and 1,2,3,4,5- substituted imidazoles) according to the present invention should exhibit a greater herbicidal activity, and in particular a selective herbicidal activity, than the aromatic-substituted imidazolidines known at present in the art (cf. U.S. patent specification No. 2,895,817) which are believed to constitute the chemically most closely related active agents with the same type of activity. Therefore the compounds according to the instant invention represent a valuable addition to the art.

When the employed starting materials, in accordance with one specific embodiment of the present invention, are oxalyl chloride and 1-(2-benzthiazolyl)-3-methylurea, the reaction sequence can be represented by the following scheme of formulae

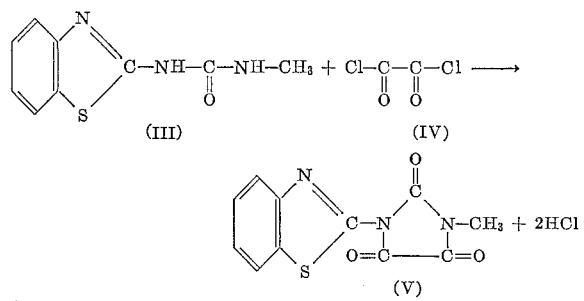

The urea derivatives to be employed as starting material for the reaction according to the present invention are clearly characterized by the above specified Formula II. In this formula, Y and Z each represents oxygen or sulphur, and each X may represent hydrogen, alkyl with 1 to 2 carbon atoms, such as methyl and ethyl, as well as halogen, preferably chlorine and bromine, but also contemplating iodine and fluorine. R preferably represents hydrogen, alkyl with 1 to 5 carbon atoms, alkenyl with 2 to 5 carbon atoms and alkynyl (alkinyl) with 2 to 5 carbon atoms. These radicals represented by R also may be substituted by halogen, and are preferably substituted by chlorine and/or bromine, although iodine and fluorine substituents are also contemplated.

Oxalyl chloride is preferably employed as the second starting reactant. However, it can also be replaced in the instant process by the use of any other reactive derivatives of oxalic acid, for instance by the corresponding oxalyl bromide, iodide or fluoride or by esters of oxalic acid, and in particular by the esters of oxalic acid with lower alcohols especially lower alkanols having 1-6 carbon atoms.

The reaction according to the present invention can be carried out conveniently, if desired, in the presence of liquid diluents or reaction media. When use is made of the highly reactive oxalyl chloride, it is particularly convenient to employ inert organic solvents. These diluents or inert organic solvents usable, in accordance with the invention, preferably include hydrocarbons such as aliphatic hydrocarbons, e.g. benzine, etc.; aromatic hydrocarbons, and especially unsubstituted, monoloweralkyl- and dilower alkyl-substituted mononuclear aryl hydrocarbons, e.g. benzene, toluene, xylene; halogenated hydrocarbons, and especially chlorinated hydrocharbons, e.g. chlorobenzene, tetrachloroethane, etc. When use is made of the less reactive esters of oxalic acid, i.e. esters with lower alkanols, other organic solvents may also be employed as well, such as ethers, especially cycloalkyl ethers, for instance dioxan and tetrahydrofuran; and ketones, for instance, di-$C_1$-$C_6$ lower alkyl ketones, e.g. dimethyl ketone (acetone), methylethyl ketone, diethyl ketone, methyl isopropyl ketone, ethyl isopropyl ketone, di-isopropyl ketone, methyl isobutyl ketone, ethyl isobutyl ketone, dibutyl ketone, dihexyl ketone, etc.

The reaction temperatures in accordance with the present invention may be varied within a fairly wide range. In general, the operation is carried out at temperatures substantially between about 20 and 150° C., preferably between about 50 and 100° C.

The best progress of the reaction is achieved generally by introducing the particular urea or thiourea compound in the form of a dry powder or by means of an endless screw, i.e. worm feed, at about 50° C. into a solution of oxalyl chloride, for example, wherein the reaction starts at once with strong evolution of hydrogen chloride and the resultant imidazolidine separates directly. About 1.1 moles of oxalyl chloride are employed during this operation per 1 mole of urea or thiourea compound (i.e. using preferably 10% molar excess of the oxalyl compound). The reaction mixture is heated at about 50° C. and then in a boiling water bath until the elimination of hydrogen chloride has been completed.

The unreacted oxalyl chloride is distilled off in vacuo after completion of the reaction, together with some of the solvent. In general, the imidazolidine separates as a crystalline substance and can at once be obtained in a pure state by filtering and washing with a readily volatile solvent such as petroleum ether, ether or ethylene chloride.

The following may be mentioned as being particularly active imidazolidines:

1-(2-benzthiazolyl)-3-methyl-imidazolidine-2,4,5-trione,
1-(2-benzthiazolyl)-3-ethyl-imidazolidine-2,4,5-trione,
1-(2-benzthiazolyl)-3-butyl-imidazolidine-2,4,5-trione, and
1-(2-benzthiazolyl)-3-methyl-imidazolidine-2-thione-3,4-dione.

The compounds according to the present invention possess very good selective herbicidal properties, i.e. phytotoxic and/or phytocidal properties, when they are sprayed onto plants after these have emerged from the soil. They can be employed for selective weed control in agricultural cultivation, particularly with regard to beet cultivation.

The compounds according to the instant invention can be utilized, if desired, in the form of the usual formulations or compositions with dispersible carrier vehicles, such as emulsifiable concentrates, spray powders, pastes, soluble powders, dusting agents and granulates. These are prepared in known manner, for instance by extending the active agents with solvents and/or dispersible solid carriers, optionally by the use of emulsifying agents (cf. Agricultural Chemicals, March 1960, pages 35–38). The following may be mainly considered for use as carrier vehicles or assistants for this purpose: solvents such as aromatic hydrocarbons (for instance benzene, toluene, xylene, etc.), chlorinated aromatic hydrocarbons (for instance chlorobenzenes), paraffins (for instance petroleum fractions), alcohols (for instance methanol, ethanol, butanol, etc.), amines (for instance ethanolamine, dimethyl formamide, etc.), ketones (for instance acetone), and water; finely divided solid carriers such as natural ground minerals (for instance kaolins, alumina, chalk, i.e., calcium carbonate, talc, etc), and synthetic ground minerals (for instance highly dispersed silicic acid, silicates, eg, alkali silicates, etc); emulsifying agents such as non-ionic and anionic emulsifying agents (for instance polyethylene oxide esters of fatty acids, polyethylene oxide ethers of fatty alcohols, alkyl sulfonates, aryl sulfonates, etc., and especially alkyl aryl-polyglycol ether); and dispersing agents such as lignin, sulfite waste liquors, methyl cellulose, etc.

The active agents according to the instant invention may be present in the compositions in the form of mixtures with other known active agents, if desired.

In general, the compositions or formulations contain substantially between about 0.1 and 95 percent by weight of the active agent, and preferably substantially between about 0.5 and 90 percent by weight.

The substances according to the invention may be employed by themselves, in the form of their compositions with carrier vehicles or other known active agents, or in the form of particular dosage preparations for specific application which are made therefrom. Their application is carried out by the normal method, for instance by watering, spraying, atomizing, dispersing or dusting the compounds per se or their compositions onto the plants. The amounts employed during these operations depend on a variety of factors, such as the cultivation, soil, weed and atmospheric conditions.

In general, the amounts used for application are between 2 and 10 kg./ha. With regard to the compounds per se, the proportions thereof which may be applied vary within wide limits and preferably range in concentration substantially between about 0.01 and 2.0%.

The very good herbicidal activity of the compounds according to the present invention for instance is demonstrated below in Example 1.

It is possible in accordance with the present invention to show that 1-(2-benzthiazolyl)-3-methyl-imidazolidine-2,4,5-trione according to Formula V above and 1-(2-benzthiazolyl) - 3-methyl-imidazolidine-2-thione-4,5-dione according to Formula VI below have a stronger herbicidal activity than the herbicidal aromatic-substituted imidazolidines which are chemically most closely related to this class of compounds (U.S. patent specification No. 2,895,-817), for instance 1-(phenyl)-3-methyl-imidazolidine-2,4,5-trione according to Formula A above and 1-(3,4-dichlorophenyl) - 3-methyl-imidazolidine-2,4,5-trione according to Formula B below. In addition, the mechanism of the activity of the compounds according to the instant invention differs from that of the activity of such known compounds. The compounds according to the invention only affect the standing growth (i.e. acting as post-emergence herbicides) and their activity does not extend to the soil, whereas the aromatic-substituted imidazolidines have a considerable activity on the soil aspre-emergence herbicides (U.S. patent specification No. 2,895,817). This constitutes a considerable advantage for the compounds according to the invention especially when it is intended to sow new cultivated plants in the soil after a destruction of weeds.

The suitability of the compounds according to the present invention for selective weed control in agricultural cultivation can be demonstrated, for example, with regard to the compound (VI) below of the invention. In this case, beet growing is specified as an example of agricultural cultivation.

The following examples are given for the purpose of illustration, and not limitation, of the present invention.

EXAMPLE 1

Post-emergence test:
    Solvent—4 parts by weight of acetone
    Emulsifying agent—0.2 parts by weight of benzyloxypolyglycol ether.

In order to prepare a suitable composition of the active agent, 1 part by weight of the active agent is mixed with the specified amount of solvent, the specified amount of the emulsifying agent is then added, and the concentrate is subsequently diluted with water to give the desired final concentration of the formulation or composition.

Test plants having a height of about 5–15 cm. are sprayed with the composition of the active agent until they are just dewy wet.

The degree of damage to the plants is estimated three weeks later and described by the use of the characteristic indices 0–5 which have the following significance:

0—no effect
1—individual slight smut spots
2—distinct damage to leaf
3—individual leaves and some stem parts have died
4—plant partly destroyed
5—plant is completely dead.

The active agents, concentrations of the active agents and results are given in the following table:

It will be seen from the foregoing table that the compounds in accordance with the present invention, for instance, compounds (V′), (VI), (VII), and (VIII), exhibit a favorable selective phytotoxic and/or herbicidal activity with respect to post-emergence weeds, such as millet, mustard, gallant soldier, chickweed, and camomile, etc., while such compounds do not adversely affect to a significant extent the growth of valuable plant crops, such as beets, oats, cotton, wheat, tomatoes, beans, etc. The selective action of the compounds of the instant type, as the artisan will appreciate, may be controlled by suitable control of the concentration of the active compound applied to the crop area containing the valuable crops as well as the weeds to be destroyed. Thus, concentrations of active agents of the instant type as low as 0.05% are effective against weeds, yet such concentrations exhibit little adverse effect on the valuable plant crops. Of course, where it is desired to cultivate a particular crop, by choosing a particular compound of the instant type and also desirably its concentration, other plants may also be de-

*Table*

POST-EMERGENCE TEST

| No. | Active agent | Percent Concentration of active agent | Millet | Beet | Oats | Cotton | Wheat | Mustard | Tomatoes | Beans | Gallant Soldier | Chickweed | Camomile |
|---|---|---|---|---|---|---|---|---|---|---|---|---|---|
| (1) | (V′) | 0.4 | 5 | 5 | 5 | 4–5 | 5 | 5 | 5 | 5 | 5 | 5 | 5 |
|  |  | 0.2 | 5 | 5 | 4–5 | 3 | 4 | 5 | 4 | 4 | 5 | 5 | 5 |
|  |  | 0.1 | 5 | 4–5 | 3–4 | 2 | 3 | 5 | 4 | 2 | 5 | 5 | 5 |
|  |  | 0.05 | 4–5 | 2 | 2 | 1 | 1 | 5 | 3 | 0 | 4 | 5 | 5 |
| (2) | (VI) | 0.4 | 5 | 2 | 5 | 4 | 5 | 5 | 4 | 4–5 | 5 | 5 | 5 |
|  |  | 0.2 | 5 | 1 | 4–5 | 3 | 5 | 5 | 3 | 4 | 5 | 5 | 5 |
|  |  | 0.1 | 5 | 0–1 | 3 | 2 | 5 | 5 | 2 | 3 | 3 | 5 | 4 |
|  |  | 0.05 | 5 | 0 | 2 | 1 | 5 | 5 | 1 | 2 | 2 | 5 | 3 |
| (3) | (VII) | 0.4 | 5 | 3 | 4 | 3 | 3 | 5 | 2 | 3 | 3 | 3 | 4–5 |
|  |  | 0.2 | 4 | 2 | 1 | 3 | 3 | 4–5 | 2 | 2 | 3 | 3 | 3 |
|  |  | 0.1 | 4 | 0 | 1 | 1 | 2 | 4 | 1 | 1 | 2 | 2 | 2 |
|  |  | 0.05 | 3 | 0 | 1 | 1 | 1–2 | 3–4 | 1 | 1 | 1–2 | 2 | 1 |
| (4) | (B) (known) | 0.4 | 5 | 5 | 4 | 3 | 3 | 5 | 5 | 5 | 5 | 5 | 5 |
|  |  | 0.2 | 5 | 5 | 3–4 | 2 | 2 | 5 | 4–5 | 4 | 5 | 5 | 5 |
|  |  | 0.1 | 5 | 5 | 2 | 1 | 1–2 | 5 | 4 | 3 | 4 | 5 | 3–4 |
|  |  | 0.05 | 5 | 5 | 1 | 0 | 1 | 5 | 3–4 | 2 | 3 | 5 | 2 |
| (5) | (A) (known) | 0.4 | 5 | 5 | 4–5 | 2 | 4–5 | 5 | 4–5 | 4–5 | 5 | 5 | 5 |
|  |  | 0.2 | 5 | 4 | 3 | 1 | 2 | 5 | 3 | 4–5 | 5 | 5 | 5 |
|  |  | 0.1 | 4–5 | 4 | 3 | 1 | 1–2 | 5 | 5 | 1 | 4 | 4 | 5 |
|  |  | 0.05 | 3 | 4 | 0 | 0 | 0 | 5 | 0 | 2 | 1 | 5 | 4 |
| (6) | (VIII) | 0.2 | 4–5 | 2–3 | 2 | 0 | 1 | 5 | 1 | 1 | | | | stroyed so that the plant or crop which it is intended to maintain, can grow free from such other plant life which might reduce soil nutrients for the particular plant crop to be cultivated.

In this regard, it is seen from the Table that compound (V′) does not adversely affect beans when used in a concentration of 0.05% and does not substantially adversely affect other desirable plant crops at such concentration, whereas a good phytotoxic or herbicidal effect is exerted with respect to various weeds. When using such compound (V′) at a concentration of 0.1%, selective action is exerted as well on beets, oats, wheat, and tomatoes, whereas only slight adverse effects occur with regard to cotton and beans. Accordingly, if a particular acreage is being cultivated for beans, which previously had been used for growing beets, oats, wheat or tomatoes, for example, residual seeds in the soil which might lead to post-emergence plants of the corresponding kind, could be destroyed, by using 0.1% of compound (V′), along with any attendant weeds, so that the cultivated beans could grow under maximum available supply of plant nutrient from the soil.

In the case of the compound (VI), when used in a concentration of 0.05%, acreage used for growing beans can be selectively rid of weeds as well as other plants of the type indicated, and this will extend in a more or less progressive way, not only to such various weeds but also to such various other crop varieties, as the concentration of compound (VI) is increased.

The same is true more or less in the case of compound (VII), as here again with increasing concentration of the active agent, undesired plant varieties and weeds may be selectively destroyed, yet little or no damage will extend, for example, to beets.

In the case of compound (VIII), besides weeds, such as millet and mustard, using a concentration of 0.2% leads to selective destroying of beets and oats to some extent, whereas cotton is not affected by such compound at such concentration.

In contrast to the foregoing typical compounds and activities, in accordance with the present invention, the known compound (A) is not so selective and results in the destruction of many types of valuable crops indiscriminately with weed destruction and cannot be used in a low concentration of 0.05% to destroy gallant soldier, whereas at such low percentage, beans are destroyed. Also, in the case of the known compound (B) similarly poor results occur, since at 0.05% concentration, camomile is not sufficiently destroyed whereas both beets and tomatoes are. The known compounds, as it is clear from the foregoing results, cannot be used selectively in the manner of the present invention to achieve in a broad way, the destruction of weeds, without also destroying valuable crops, or to achieve besides the destruction of such weeds, the destruction of certain of such crop varieties, depending upon incremental increases in concentration of the active compound where it is desired to eliminate from the soil various post-emergence plant life other than a particular variety, so that such particular variety may enjoy maximum beneficial growth conditions.

EXAMPLE 2

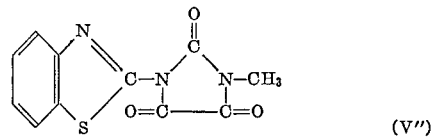
(V″)

21 cc. of oxalyl chloride in 250 cc. of chlorobenzene are warmed to 50° C. and 41 g. of 1-(2-benzthiazolyl)-3-methylurea are introduced in small portions and an evolution of hydrogen chloride sets in at once. When the introduction has been completed (10 min.), the mixture is heated at 100° C. in a water bath until the evolution of hydrogen chloride has been completed (1 hour). It is then cooled to 5–10° C., and the compound which has crystallized out is filtered off and washed twice with ether. Yield: 48 g. of 1-(2-benzthiazolyl)-3-methyl-imidazolidine-2,4,5-trione of M.P. 211–213° C.

*Analysis.*—$C_{11}H_7N_3O_3S$ of molecular weight 261. Found: C, 50.34% (50.31%). Calculated: C, 50.55%. Found: H, 2.79% (2.82%). Calculated: H, 2.68%.

EXAMPLE 3

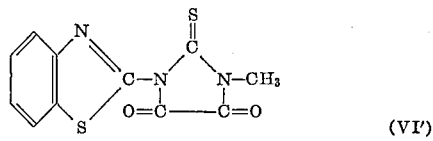
(VI′)

480 cc. of oxalyl chloride in 3 litres of chlorobenzene are warmed to 40° C. and 960 g. of 1-(2-benzthiazolyl)-3-methyl-thiourea are introduced in the form of a dry powder by means of an endless screw over a period of 1.5 hours. An evolution of hydrogen chloride sets in at once and a yellow compound separates in the form of crystals. When the thiourea has been introduced, heating at 80–100° C. is continued for another 2 hours until the elimination of gas has been completed. The crystalline substance wholly dissolves during this operation. The mixture is then cooled to 0–5° C. while stirring and the novel compound thereupon separates. It is filtered off and washed with petroleum ether.

Yield: 1006 g. of 1-(2-benzthiazolyl)-3-methyl-imidazolidine-2-thione-4,5-dione of M.P. 195–197° C. (yellow crystals).

The following compounds are prepared by an analogous method:

| | Formula | M.P. |
|---|---|---|
| (VII′) | 1-(2-benzthiazolyl)-3-ethyl-imidazolidine-2,4,5-trione | 175–176° C. |
| (IX) | 1-(2-benzthiazolyl)-3-n.-butyl-imidazolidine-2,4,5-trione | 125–127° C. |

| | Formula | M.P. |
|---|---|---|
| (X) | 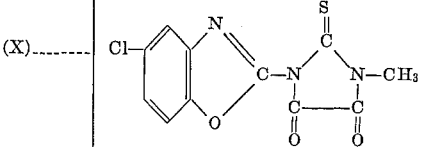<br>1-[2-(5-chlorobenzoxazolyl)]-3-methyl-imidazolidine-2-thione-4,5-dione | 254° C. (decomp.). |
| (XI) | 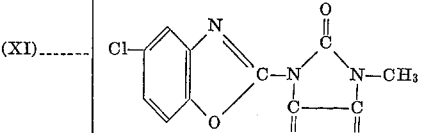<br>1-[2-(5-chlorobenzoxazolyl)]-3-methyl-imidazolidine-2,4,5-trione | 205–206° C. (decomp.). |
| (XII) | 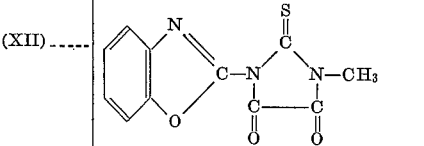<br>1-(2-benzoxazolyl)-3-methyl-imidazolidine-2-thione-4,5-dione | 222–224° C. (decomp.). |
| (XIII) | 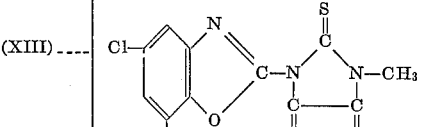<br>1-[2-(5,7-dichlorobenzoxazolyl)]-3-methyl-imidazolidine-2-thione-4,5-dione | 240° C. (decomp.). |
| (XIV) | 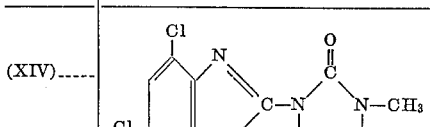<br>1-[2-(4,6-dichlorobenzoxazolyl)]-3-methyl-imidazolidine-2,4,5-trione | 245° C. (decomp.). |
| (XV) | 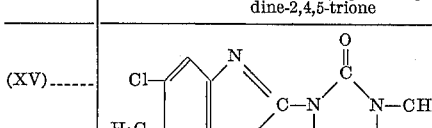<br>1-[2-(5-chloro-6-methyl benzthiazolyl)]-3-methyl-imidazolidine-2,4,5-trione | 235° C. (decomp..) |
| (XVI) | 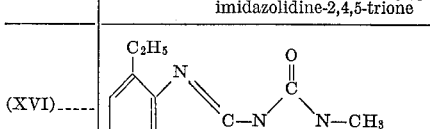<br>1-[2-(4-ethyl benzthiazolyl)]-3-methyl-imidazolidine-2,4,5-trione | 175–177° C. |
| (XVII') | 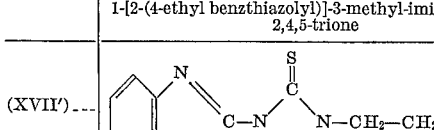<br>1-(2-benzthiazolyl)-3-(2-chloroethyl)-imidazolidine-2-thione-4,5-dione | Hygroscop. powder. |

| | Formula | M.P. |
|---|---|---|
| (VIII') | 1-(2-benzthiazolyl)-3-α-allyl-imidazolidine-2-thione-4,5-dione | 249–251° C. |
| (XVIII) | 1-(2-benzoxazolyl)-3-n.-butyl-imiadzolidine-2,4,5-trione | 201° C. |
| (XIX) | 1-(2-benzoxazolyl)-3-ethyl-imidazolidine-2,4,5-trione | 184–189° C. |
| (XX) | 1-(2-benzthiazolyl)-3-sec.-butyl-imidazolidine-2-thione-4,5-dione | 168° C. |

Each of the compounds noted above in Examples 2 and 3, and especially those prepared by an analogous method, represent valuable substituted imidazolidines since they possess selective phytotoxic and/or phytocidal or herbicidal properties which permit the same to be used for the selective destruction of post-emergence weeds and/or undesired plants, depending upon the concentration of the active compound used, whereby one or more particular kinds of cultivatable plant crops may be permitted to grow in the soil with maximum attendant nutrient benefit therefrom.

EXAMPLE 4

Example 3 is repeated analogously using, in each case, oxalyl chloride, oxalyl bromide, oxalyl iodide, oxalyl fluoride, dimethyl-, diethyl-, di-n.-propyl-, di-isopropyl-, di-n.butyl-, di-isobutyl-, di-sec.-butyl-, di-tert.-butyl-, di-amyl- and dihexyl-oxalate, respectively, with each of the following substituted imidazolidines, respectively:

2-benzoxazolyl-urea
2-(4-chloro-benzoxazolyl)-urea
2-(7-bromo-benzoxazolyl)-urea
2-(7-methyl-benzoxazolyl)-urea
2-(6-methyl-5-ethyl-benzoxazolyl)-urea
2-(7-methyl-4-chloro-benzoxazolyl)-urea
2-benzoxazolyl-thiourea
2-(6-chloro-benzoxazolyl)-thiourea
2-(5-ethyl-benzoxazolyl)-thiourea
2-(4,7-dimethyl-benzoxazolyl)-thiourea
2-(6-methyl-5-bromo-benzoxazolyl)-thiourea
2-benzthiazolyl-urea
2-(6-chloro-benzthiazolyl)-urea
2-(5-methyl-benzthiazolyl)urea
2-(4-methyl-6-chloro-benzthiazolyl)-urea
2-benzthiazolyl-thiourea
2-(7-bromo-benzthiazolyl)-thiourea
2-(6-ethyl-benzthiazolyl)-thiourea
2-(5-methyl-6-chloro-benzthiazolyl)-thiourea
1-(2-benzoxazolyl)-3-methyl-urea
1-(2-benzoxazolyl)-3-isopropyl-urea
1-(2-benzoxazolyl)-3-sec.-butyl-urea
1-(2-benzoxazolyl)-3-n.-amyl-urea
1-(2-benzoxazolyl)-3-vinyl-urea
1-(2-benzoxazolyl)-3-n.-penten-3-yl-urea
1-(2-benzoxazolyl)-3-ethynyl-urea
1-(2-benzoxazolyl)-3-n.-pentyn-4-yl-urea
1-[2-(7-iodo-benzoxazolyl)]-3-ethyl-urea
1-[2-(6-chloro-benzoxazolyl)]-3-isoamyl-urea
1-[2-(4-bromo-benzoxazolyl)]-3-β-allyl-urea
1-[2-(5-fluoro-benzoxazolyl)]-3-ethynyl-urea
1-[2-(7-chloro-benzoxazolyl)]-3-n-pentyn-3-yl-urea
1-[2-(5-ethyl-benzoxazolyl)]-3-ethyl-urea
1-[2-(4-methyl-benzoxazolyl)]-3-n-amyl-urea
1-[2-(7-ethyl-benzoxazolyl)]-3-γ-allyl-urea
1-[2-(6-methyl-benzoxazolyl)]-3-n-propyn-2-yl-urea
1-[2-(4-ethyl-5-chloro-benzoxazolyl)]-3-methyl-urea
1-[2-(6-methyl-4-bromo-benzoxazolyl)]-3-vinyl-urea
1-[2-(5-methyl-6-fluoro-benzoxazolyl)]-3-n-pentyn-4-yl-urea
1-(2-benzoxazolyl)-3-ethyl-thiourea
1-(2-benzoxazolyl)-3-n-butyl-thiourea
1-(2-benzoxazolyl)-3-vinyl-thiourea
1-(2-benzoxazolyl)-3-ethynyl-thiourea
1-[2-(4-chloro-benzoxazolyl)]-3-n.-pentyl-thiourea
1-[2-(5-chloro-benzoxazolyl)]-3-γ-allyl-thiourea
1-[2-(6-bromo-benzoxazolyl)]-3-n-butyn-2-yl-thiourea
1-[2-(7-ethyl-benenzoxazolyl)]-3-methyl-thiourea
1-[2-(5,6-di-ethyl-benzoxazolyl]-3-penten-3-yl-thiourea
1-[2-(4-methyl-benzoxazolyl)]-3-n-propyn-2-yl-thiourea
1-[2-(6-methyl-4-chloro-benzoxazolyl)]-3-n-butyl-thiourea
1-[2-(5-ethyl-7-chloro-benzoxazolyl)]-3-vinyl-thiourea 1-[2-(7-methyl-6-fluoro-benzoxazolyl)]-3-ethynyl-
thiourea
1-(2-benzthiazolyl)-3-methyl-urea
1-(2-benzthiazolyl)-3-γ-allyl-urea
1-(2-benzthiazolyl)-3-n.-pentyn-3-yl-urea
1-[2-(4-iodo-5-chloro-benzthiazolyl)]-3-n-propyl-urea
1-[2-(7-bromo-benzthiazolyl)]-3-n-buten-3-yl-urea
1-[2-(4-fluoro-benzthiazolyl)]-3-ethynyl-urea
1-[2-(4-methyl-benzthiazolyl)]-3-n-pentyl-urea
1-[2-(4,7-dimethyl-benzthiazolyl)]-3-n.-propen-2-yl-urea
1-[2-(5-ethyl-benzthiazolyl)]-3-n.-butyn-4-yl-urea
1-[2-(4-methyl-5-chloro-benzthiazolyl)]-3-tert.-butyl-
urea
1-[2-(5-ethyl-7-bromo-benzthiazolyl)]-3-vinyl-urea
1-[2-(6-methyl-7-chloro-benzthiazolyl)]-3-ethynyl-urea
1-(2-benzthiazolyl)-3-ethyl-thiourea
1-(2-benzthiazolyl)-3-isopropenyl-thiourea
1-(2-benzthiazolyl)-3-n.-pentyn-3-yl-thiourea
1-[2-(5-chloro-benzthiazolyl)]-3-isobutyl-thiourea
1-[2-(4,6-dibromo-benzthiazolyl)]-3-γ-allyl-thiourea
1-[2-(5,7-diiodo-benzthiazolyl)]-3-n.-butyn-2-yl-thiourea
1-[2-(4,5,6,7-tetramethyl-benzthiazolyl)]-3-ethyl-
thiourea
1-[2-(4,6,7-triethyl-benzthiazolyl)]-3-isobutenyl-thiourea
1-[2-(5-methyl-benzthiazolyl)]-3-sec.-butynyl-thiourea
1-[2-(5,6,7-trimethyl-4-chloro-benzthiazolyl)]-3-n-
pentyl-thiourea
1-[2-(4-methyl-5-chloro-6-fluoro-7-ethyl-benzthiozolyl)]-
3-vinyl-thiourea
1-[2-(5-ethyl-6-iodo-benzthiazolyl)]-3-n-pentyn-2-yl-
thiourea
1-(2-benzoxazolyl)-3-(β-chloropropyl)-urea
1-(2-benzoxazolyl)-3-(5-chloro-penten-3-yl)-urea
1-(2-benzoxazolyl)-3-(4-chloro-n-butyn-2-yl)-urea
1-[2-(6-fluoro-7-bromo-benzoxazolyl)]-3-(β-bromo-
methyl)-urea
1-[2-(4,7-dichloro-5-iodo-benzoxazolyl)]-3-(3-chloro-
β-allyl)-urea
1-[2-(4,5,6,7-tetrachloro-benzoxazolyl)]-3-(2,3-dibromo-
pentyn-4-yl)-urea
1-[2-(4-ethyl-5-methyl-benzoxazolyl)]-3-(1,2-difluoro-
ethyl)-urea
1-[2-(4,5,6,7-tetraethyl-benzoxazolyl)]-3-(3-iodo-β-
allyl)-urea
1-[2-(7-methyl-benzoxazolyl)]-3-(3-chloro-propyn-
2-yl)-urea
1-[2-(4-methyl-5,6-dibromo-benzoxazolyl)]-3-bromo-
methyl-urea
1-[2-(5-ethyl-7-iodo-benzoxazolyl)]-3-(β-chloro-vinyl)-
urea
1-[2-(6,7-dimethyl-4,5-dichloro-benzoxazolyl)]-3-
(2-fluoro-3-bromo-n.-pentyn-4-yl)-urea
1-(2-benzoxazolyl)-3-(1-bromomethyl-ethyl)-thiourea
1-(2-benzoxazolyl)-3-(2,3-dichloro-n.-penten-4-yl)-
thiourea
1-(2-benzoxazolyl)-3-(2-chloromethyl-butyn-3-yl)-
thiourea
1-[2-(4,5-dibromo-benzoxazolyl)]-3-(β-chloro-ethyl)-
thiourea
1-[2-(7-iodo-benzoxazolyl)]-3-(5-iodo-n.-penten-3-yl)-
thiourea
1-[2-(4,5,6,7-tetrachloro-benzoxazolyl)]-3-(4-chloro-
n.-butyn-2-yl)-thiourea
1-[2-(5-iodo-benzoxazolyl)]-3-(iodomethyl)-thiourea
1-[2-(4-fluoro-benzoxazolyl)]-3-(3-chloro-buten-2-yl)-
thiourea
1-[2-(6-chloro-benzoxazolyl)]-3-(bromo-ethynyl)-
thiourea
1-[2-(4-methyl-7-chloro-benzoxazolyl)]-3-(chloro-
methyl)-thiourea
1-[2-(5,6-dimethyl-4-bromo-benzoxazolyl)]-3-(β-iodo-
vinyl)-thiourea
1-[2-(7-ethyl-4-fluoro-benzoxazolyl)]-3-(3-fluoro-
propyn-2-yl)-thiourea
1-(2-benzthiazolyl)-3-(2-chloro-n.-propyl)-urea
1-(2-benzthiazolyl)-3-(3-bromo-β-allyl)-urea
1-(2-benzthiazolyl)-3-(2,3-dichloro-n.-pentyn-4-yl)-urea
1-[2-(4,5,6,7-tetrabromo-benzthiazolyl)]-3-(β-bromo-
ethyl)-urea
1-[2-(5,6-dichloro-benzthiazolyl)]-3-(2-chloromethyl-
propen-2-yl)-urea
1-[2-(4,5-difluoro-6,7-diiodo-benzthiazolyl)]-3-(2-
chloromethyl-3-iodo-butyn-3-yl)-urea
1-[2-(5-methyl-6-ethyl-benzthiazolyl)]-3-(3-bromo-
n.-propyl)-urea
1-[2-(6,7-dimethyl-5-fluoro-benzthiazolyl)]-3-(3-fluoro-α-allyl)-
urea
1-[2-(4,7-diethyl-benzthiazolyl)]-3-(β-chloroethynyl)-
urea
1-[2-(4-methyl-5-chloro-benzthiazolyl)]-3-(2-chloro-
n-pentyl)-urea
1-[2-(5-ethyl-6-methyl-7-bromo-benzthiazolyl)]-3-
(3-fluoro-n.-propen-2-yl)-urea
1-[2-(7-ethyl-4,5,6-triiodo-benzthiazolyl)]-3-(4-chloro-
n.-butyn-2-yl)-urea
1-(2-benzthiazolyl)-3-(chloromethyl)-thiourea
1-(2-benzthiazolyl)-3-(2-bromo-vinyl)-thiourea
1-(2-benzthiazolyl)-3-(3-chloro-butyn-2-yl)-thiourea
1-[2-(5-chloro-benzthiazolyl)]-3-(3,3,4,5-tetrachloro-
pentyl)-thiourea
1-[2-(6-iodo-benzthiazolyl)]-3-(1-fluoro-α-allyl)-thiourea
1-[2-(4-bromo-5-fluoro-benzthiazolyl)]-3-(1-iodo-
propyn-2-yl)-thiourea
1-[2-(5-ethyl-benzthiazolyl)]-3-(5-bromo-n.-pentyl)-
thiourea
1-[2-(4,5-dimethyl-benzthiazolyl)]-3-(2-chloro-vinyl)-
thiourea
1-[2-(7-ethyl-benzthiazolyl)]-3-(3-iodo-n.-butyn-4-yl)-
thiourea
1-[2-(5-methyl-6-chloro-benzthiazolyl)]-3-(4-chloro-
5-iodo-n.-pentyl)-thiourea
1-[2-(4-ethyl-5-iodo-6-fluoro-benzthiazolyl)]-3-(2-iodo-
n.-buten-4-yl)-thiourea
1-[2-(5-methyl-7-chloro-benzthiazolyl)]-3-(3-bromo-
n.-pentyn-4-yl)-thiourea;

and the corresponding benzoxazolyl-imidazolidine-2,4,5-
triones, benzoxazolyl-imidazolidine-2-thione-4,5-diones,
benzthiazolyl-imidazolidine-2,4,5-triones, and benzthi-
azolyl-imidazolidine-2-thione-4,5-diones, are formed, each
of which possess the noted phytotoxic and/or phytocidal
or herbicidal activity with respect to post-emergence
weeds and/or undesired plants, depending upon the con-
centration of the particular active compound used, where-
by one or more particular kinds of cultivatable plant
crops may be permitted to grow in the soil with maxi-
mum attendant nutrient benefit therefrom.

In the case of each of the foregoing contemplated
active compounds, the selective weed killing action is
favorably exerted upon the post emergence weeds: millet,
mustard, gallant soldier, chickweed, camomile, and the
like, such that depending upon the concentration used
cultivatable crops such as beets, oats, cotton, wheat, to-
matoes, beans, and the like may be permitted to grow
more efficiently in the absence of such weeds.

In accordance with the present invention, therefore,
a process may be provided for the production of substi-
tuted imidazolidines which comprises reacting substituted
urea of the formula

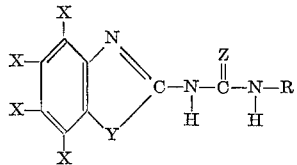

in which each X is selected from the group consisting of
hydrogen, alkyl having 1–2 carbon atoms, and halogen;
Y and Z each is selected from the group consisting of
oxygen and sulfur; and R is selected from the group consisting of hydrogen, aliphatic having 1–5 carbon atoms inclusive, and haloaliphatic having 1–5 carbon atoms inclusive; with an oxalic acid compound of the formula

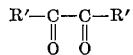

in which R' is selected from the group consisting of halo and alkoxy having 1–6 carbon atoms, to form substituted imidazolidines of the formula

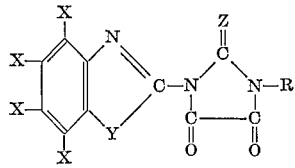

in which X, Y, Z and R have the foregoing meaning.

The reaction is preferably carried out in the presence of an inert organic liquid solvent, such as a member selected from the group consisting of aliphatic hydrocarbons, aromatic hydrocarbons, and halogenated hydrocarbons, in the case of the more active oxalyl compounds, such as oxalyl chloride, oxalyl bromide, oxalyl iodide, and oxalyl fluoride, or a member selected from the group consisitng of aliphatic hydrocarbons, aromatic hydrocarbons, halogenated hydrocarbons, cycloalkyl ethers, and aliphatic ketones, in the case of di-lower alkyl oxalate, i.e. preferably di-$C_1$-$C_6$ lower alkyl oxalates, e.g. esters of oxalic acid with lower alkanols having 1 to 6 carbon atoms in each lower alkyl chain. The reaction is preferably carried out at a temperature substantially between about 20 and 120° C.

Such compounds possess the desired selective phytotoxic and/or phytocidal properties with respect to post-emergence weeds, and these compounds may be used advantageously in admixture with a carrier vehicle to form a phytotoxic preparation useful in destroying post-emergence weeds. All that is needed is a phytotoxic amount of the subject compound in the preparation which is sufficient to cause the destruction of the weeds to be attained.

Accordingly, the present invention also contemplates a method of combatting post-emergence weeds in the soil which comprises applying to such emergence weeds in the soil a phytotoxic amount of an imidazolidine of the instant type. The active compound may be used suitably in a concentration of substantially between about 0.01–2.0%.

In accordance with the foregoing, it will be appreciated that where the designation X is alkyl, the same may represent methyl and ethyl, and that where such designation is halogen, the same may represent preferably chlorine or bromine, but also iodine and fluorine, atoms as well, and of course each X in the stated formulae may be the same or different, such as one or more hydrogen atoms, methyl groups, ethyl groups, chlorine atoms, bromine atoms, iodine atoms, and fluoridine atoms, as substituents of the 4,5,6,7-positions of the fused benzene ring in question.

In the same way, the designation R, when aliphatic, may represent the following groups: an alkyl hydrocarbon radical having 1 to 5 carbon atoms inclusive, such as methyl, ethyl, n-propyl, isopropyl, n-butyl, isobutyl, sec.-butyl, tert.-butyl, amyl; an alkenyl hydrocarbon radical having 2 to 5 carbon atoms inclusive, such as vinyl, α-, β-, and γ-allyl, $\Delta^1$-, $\Delta^2$-, $\Delta^3$-, and iso-butenyl; an alkynyl hydrocarbon radical having 2 to 5 carbon atoms inclusive, such as ethynyl, propynyl, crotonylenyl, pentynyl, and the like; and also the designation R, when haloaliphatic, may represent the foregoing enumerated alkyl, alkenyl, and alkynyl hydrocarbon radicals containing one or more chloro-, bromo-, iodo-, and fluoro-atoms as substituents thereon, such substituents contemplating mono-, di-, tri-, etc., chloro-, bromo-, iodo-, and fluoro-substituents and mixtures of such halo-substituents.

Generally, therefore, in accordance with the present invention, compounds of the following types may be provided, which exhibit the desired phytotoxic properties outlined above:

1-(2-benzoxazolyl)-imidazolidine-2,4,5-trione
1-[2-(halobenzoxazolyl)]-imidazolidine-2,4,5-trione
1-[2-($C_1$-$C_2$ alkyl-benzoxazolyl)]-imidazolidine-2,4,5-trione
1-[2-($C_1$-$C_2$ alkyl-halo-benzoxazolyl)]-imidazolidine-2,4,5-trione
1-(2-benzoxazolyl)-imidazolidine-2-thione-4,5-dione
1-[2-(halobenzoxazolyl)]-imidazolidine-2-thione-4,5-dione
1-[2-($C_1$-$C_2$ alkyl-benzoxazolyl)]-imidazolidine-2-thione-4,5-dione
1-[2-($C_1$-$C_2$ alkyl-halo-benzoxazolyl)]-imidazolidine-2-thione-4,5-dione
1-(2-benzthiazolyl)-imidazolidine-2,4,5-trione
1-[2-(halobenzthiazolyl)]-imidazolidine-2,4,5-trione
1-[2-($C_1$-$C_2$ alkyl-benzthiazolyl)]-imidazolidine-2,4,5-trione
1-[2-($C_1$-$C_2$ alkyl-halo-benzthiazolyl)]-imidazolidine-2,4,5-trione
1-(2-benzthiazolyl)-imidazolidine-2-thione-4,5-dione
1-[2-(halobenzthiazolyl)]-imidazolidine-2-thione-4,5-dione
1-[2-($C_1$-$C_2$ alkyl-benzthiazolyl)]-imidazolidine-2-thione-4,5-dione
1-[2-($C_1$-$C_2$ alkyl-halo-benzthiazolyl)]-imidazolidine-2-thione-4,5-dione
1-(2-benzoxazolyl)-3-($C_1$-$C_5$ aliphatic)-imidazolidine-2,4,5-trione
1-[2-(halobenzoxazolyl)]-3-($C_1$-$C_5$ aliphatic)-imidazolidine-2,4,5-trione
1-[2-($C_1$-$C_2$ alkyl-benzoxazolyl)]-3-($C_1$-$C_5$ aliphatic)-imidazolidine-2,4,5-trione
1-[2-($C_1$-$C_2$ alkyl-halo-benzoxazolyl)]-3-($C_1$-$C_5$ aliphatic)-imidazolidine-2,4,5-trione
1-(2-benzoxazolyl)-3-($C_1$-$C_5$ aliphatic)-imidazolidine-2-thione-4,5-dione
1-[2-halobenzoxazolyl)]-3-($C_1$-$C_5$ aliphatic)-imidazolidine-2-thione-4,5-dione
1-[2-($C_1$-$C_2$ alkyl-benzoxazolyl)]-3-($C_1$-$C_5$ aliphatic)-imidazolidine-2-thione-4,5-dione
1-[2-($C_1$-$C_2$ alkyl-halo-benzoxazolyl)]-3-($C_1$-$C_5$ aliphatic)-imidazolidine-2-thione-4,5-dione
1-(2-benzthiazolyl)-3-($C_1$-$C_5$ aliphatic)-imidazolidine-2,4,5-trione
1-[2-(halobenzthiazolyl)]-3-($C_1$-$C_5$ aliphatic)-imidazolidine-2,4,5-trione
1-[2-($C_1$-$C_2$ alkyl-benzthiazolyl)]-3-($C_1$-$C_5$ aliphatic)-imidazolidine-2,4,5-trione
1-[2-($C_1$-$C_2$ alkyl-halo-benzthiazolyl)]-3-($C_1$-$C_5$ aliphatic)-imidazolidine-2,4,5-trione
1-(2-benzthiazolyl)-3-($C_1$-$C_5$ aliphatic)-imidazolidine-2-thione-4,5-dione
1-[2-(halobenzthiazolyl)]-3-($C_1$-$C_5$ aliphatic)-imidazolidine-2-thione-4,5-dione
1-[2-($C_1$-$C_2$ alkyl-benzthiazolyl)]-3-($C_1$-$C_5$ aliphatic)-imidazolidine 2-thione-4,5-dione
1-[2-($C_1$-$C_2$ alkyl-halo-benzthiazolyl)]-3-($C_1$-$C_5$ aliphatic)-imidazolidine-2-thione-4,5-dione
1-(2-benzoxazolyl)-3-(halo-$C_1$-$C_5$ aliphatic)-imidazolidine-2,4,5-trione
1-[2-(halobenzoxazolyl)]-3-(halo-$C_1$-$C_5$ aliphatic)-imidazolidine-2,4,5-trione
1-[2-($C_1$-$C_2$ alkyl-benzoxazolyl)]-3-(halo-$C_1$-$C_5$ aliphatic)-imidazolidine-2,4,5-trione
1-[2-($C_1$-$C_2$ alkyl-halo-benzoxazoly)]-3-(halo-$C_1$-$C_5$ aliphatic)-imidazolidine-2,4,5-trione
1-(2-benzoxazolyl)-3-(halo-$C_1$-$C_5$ aliphatic)-imidazolidine-2-thione-4,5-dione
1-[2-(halobenzoxazolyl)]-3-(halo-$C_1$-$C_5$ aliphatic)-imidazolidine-2-thione-4,5-dione 1-[2-($C_1$-$C_2$ alkyl-benzoxazolyl)]-3-(halo-$C_1$-$C_5$
  aliphatic)-imidazolidine-2-thione-4,5-dione
1-[2-($C_1$-$C_2$ alkyl-halo-benzoxazolyl)]-3-(halo-$C_1$-$C_5$
  aliphatic)-imidazolidine-2-thione-4,5-dione
1-(2-benzthiazolyl)-3-(halo-$C_1$-$C_5$ aliphatic)-
  imidazolidine-2,4,5-trione
1-[2-(halobenzthiazolyl)]-3-(halo-$C_1$-$C_5$ aliphatic)-
  imidazolidine-2,4,5-trione
1-[2-($C_1$-$C_2$ alkyl-benzthiazolyl)]-3-(halo-$C_1$-$C_5$
  aliphatic)-imidazolidine-2,4,5-trione
1-[2-($C_1$-$C_2$ alkyl-halo-benzthiazolyl)]-3-(halo-$C_1$-$C_5$
  aliphatic)-imidazolidine-2,4,5-trione
1-(2-benzthiazolyl)-3-(halo-$C_1$-$C_5$ aliphatic)-
  imidazolidine-2-thione-4,5-dione
1-[2-(halobenzthiazolyl)]-3-(halo-$C_1$-$C_5$ aliphatic)-
  imidazolidine-2-thione-4,5-dione
1-[2-($C_1$-$C_2$ alkyl-benzthiazolyl)]-3-(halo-$C_1$-$C_5$
  aliphatic)-imidazolidine-2-thione-4,5-dione
1-[2-($C_1$-$C_2$ alkyl-halo-benzthiazolyl)]-3-(halo-$C_1$-$C_5$
  aliphatic)-imidazolidine-2-thione-4,5-dione It will be appreciated by the artisan, in view of the foregoing, that the present invention provides advantages with respect to agricultural endeavors, especially where rotation of crops is practiced. Thus, where a particular acreage has been planted in a previous reason with one kind of cultivatable crop and in a following reason it is desired to rotate the crop by planting a different kind, the compounds of the persent invention may be applied in predetermined concentrations to destroy any plants of the previous type of cultivated crop, so that the newly planted crop in the rotation procedure, will be able to grow with maximum nutrient benefit from the soil, since the last vestiges of post-emergence weeds and other kinds of crops or plants of other varieties will be eliminated in dependence upon the particular compound used in accordance with the present invention and the particular concentration or dosage thereof per unit area, etc.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Imidazolidines of the formula

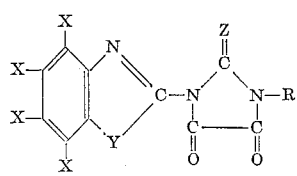

in which each X is selected from the group consisting of hydrogen, alkyl having 1–2 carbon atoms, and halogen; Y and Z each is selected from the group consisting of oxygen and sulfur; and R is selected from the group consisting of hydrogen, aliphatic hydrocarbon having 1–5 carbon atoms inclusive, and haloaliphatic hydrocarbon having 1–5 carbon atoms inclusive.

2. The compound 1-(2-benzthiazolyl)-3-methyl-imidazolidine-2,4,5-trione having the formula

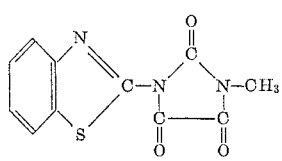

3. The compound 1-(2-benzthiazolyl)-3-methyl-imidazolidine-2-thione-4,5-dione having the formula

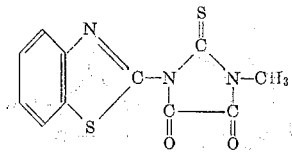

4. The compound 1 - (2 - benzthiazolyl) - 3 - ethyl-imidazolidine-2,4,5-trione having the formula

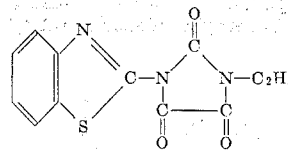

5. The compound 1 - (2 - benzthiazolyl) - 3 - α - allyl-imidazolidine-2-thione-4,5-dione having the formula

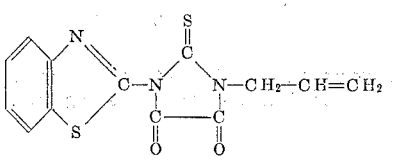

6. The compound 1 - (2 - benzthiazolyl) - 3 - n. - butyl-imidazolidine-2,4,5-trione having the formula

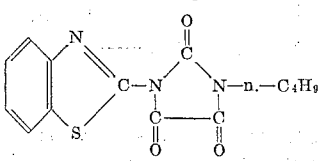

7. The compound 1 - [2 - (5 - chlorobenzoxazolyl)]-3 - methyl - imidazolidine - 2 - thione - 4,5 - dione having the formula

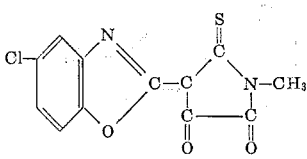

8. The compound 1 - [2 - (5 - chlorobenzoxazolyl)]-3-methyl-imidazolidine-2,4,5-trione having the formula

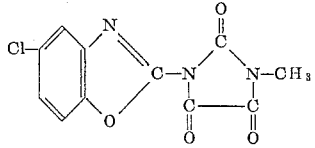

9. The compound 1 - (2 - benzoxazolyl) - 3 - methyl-imidazolidine-2-thione-4,5-dione having the formula

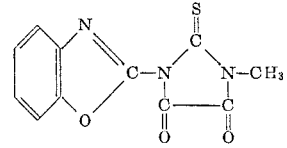

10. The compound 1-[2-(5,7-dichlorobenzoxazolyl)]-3-methyl-imidazolidine-2-thione-4,5-dione having the formula

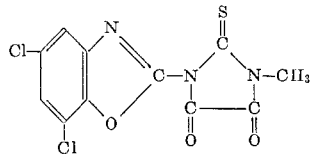

11. The compound 1-[2-(4,6-dichlorobenzoxazolyl)]-3-methyl-imidazolidine-2,4,5-trione having the formula

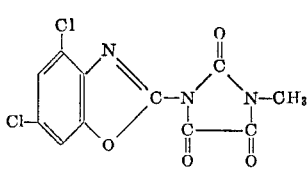

12. The compound 1 - [2 - (5 - chloro - 6 - methyl benzthiazolyl)]-3-methyl-imidazolidine-2,4,5-trione having the formula

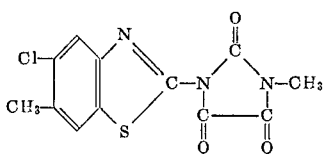

13. The compound 1 - [2 - (4 - ethyl benzthiazolyl)]-3-methyl-imidazolidine-2,4,5-trione having the formula

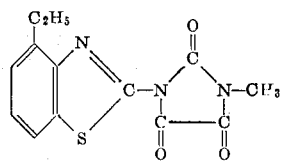

14. The compound 1 - (2 - benzthiazolyl) - 3 - (2-chloroethyl) - imidazolidine - 2 - thione - 4,5 - dione having the formula

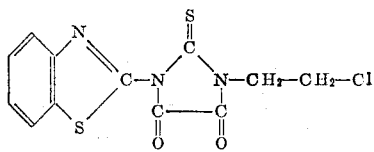

15. The compound 1 - (2 - benzoxazolyl) - 3 - n.-butyl-imidazolidine-2,4,5-trione having the formula

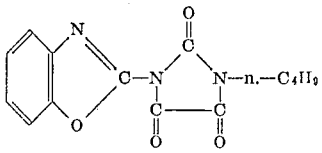

16. The compound 1 - (2 - benzoxazolyl) - 3 - ethyl-imidazolidine-2,4,5-trione having the formula

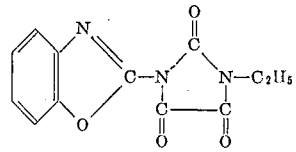

17. The compound 1 - (2 - benzthiazolyl) - 3 - sec.-butyl-imidazolidine-2-thione-4,5-dione having the formula

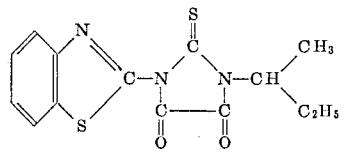

References Cited by the Examiner

UNITED STATES PATENTS

| | | | |
|---|---|---|---|
| 2,895,817 | 7/1959 | Luckenbaugh | 71—2.5 |
| 2,919,278 | 12/1959 | McGowan | 260—305 |
| 3,090,789 | 5/1963 | Dehn et al. | 260—305 |
| 3,161,495 | 12/1964 | Miller | 71—2.5 |

OTHER REFERENCES

Biltz et al.: Ber. Deut. Chem., volume 46, pages 1387–1404 (1913).

Wagner et al.: Synthetic Organic Chemistry, (New York, 1953), pages 566 and 647.

ALEX MAZEL, *Primary Examiner.*

HENRY R. JILES, *Examiner.*

ALTON D. ROLLINS, *Assistant Examiner.*